(12) United States Patent
McCarthy

(10) Patent No.: US 6,369,178 B1
(45) Date of Patent: Apr. 9, 2002

(54) POLY (CHLOROTRIFLUOROETHYLENE/ VINYLIDENEFLUORIDE/VINYLESTER) COPOLYMERS WITH EXCELLENT LONG-TERM ULTRAVIOLET LIGHT RESISTANCE

(75) Inventor: Thomas F. McCarthy, Morris County, NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/219,036

(22) Filed: Dec. 23, 1998

(51) Int. Cl.$^7$ .............................................. C08F 214/18

(52) U.S. Cl. ..................... 526/242; 526/247; 526/249; 526/250; 526/253; 526/254; 526/255; 526/291; 526/292.6

(58) Field of Search ................................ 526/242, 247, 526/249, 250, 254, 255

(56) References Cited

U.S. PATENT DOCUMENTS 5,453,477 A * 9/1995 Oxenrider ................... 526/230

* cited by examiner

*Primary Examiner*—Fred Zitomer
(74) *Attorney, Agent, or Firm*—Colleen D. Szuch

(57) ABSTRACT

A composition containing a non-flammable chlorofluoro-olefin copolymer having a crystallinity index less than about 10% and a weight-average molecular weight greater than about 1,000,000 daltons, wherein the copolymer has at least two comonomer units of the formula:

$$CX_2CYA$$

wherein each X is independently selected from H, Cl and F; Y is selected from H, Cl, F, $O(CZ_2)_nCZ_3$, $(CZ_2)_nCZ_3$, $(OCZ_2CZ_2)_nCZ_3$ and $(O(CZ_2)_n)_nCZ_3$, wherein each n is independently from about 1 to about 12 and each Z is independently selected from H, Cl and F; and A is selected from H, Cl and F, provided that for at least one comonomer unit, at least one of A, Y, either X or any Z is Cl. Substrates coated with the copolymer compositions are also disclosed.

25 Claims, 2 Drawing Sheets

POLY (CHLOROTRIFLUOROETHYLENE/ VINYLIDENEFLUORIDE/VINYLESTER) COPOLYMERS WITH EXCELLENT LONG-TERM ULTRAVIOLET LIGHT RESISTANCE

FIELD OF THE INVENTION

The present invention relates to aqueous chlorofluoropolymer dispersions. In particular, the present invention relates to aqueous chlorofluoropolymer dispersions having excellent long term ultraviolet light resistance, which can be coated onto a substrate at mild processing temperatures.

DESCRIPTION OF THE PRIOR ART

Polymers of chlorotrifluoro ethylene (CTFE) and copolymers of CTFE with vinylidene fluoride (VDF) have enjoyed significant commercial success both as a resin and a film. However, aqueous dispersions of these polymers have been of limited commercial value. Crystalline copolymers of CTFE/VDF, when the weight % of CTFE is significantly greater than VDF, regardless of how they are formed or processed, are very prone to embrittlement. Embrittlement is caused by exposure to elevated temperatures and/or ultraviolet radiation, which produce polymer morphological changes. Temperature induced embrittlement has precluded CTFE/VDF copolymers from many industrial applications servicing the chemical processing industry. Deterioration of mechanical properties by exposure to ultraviolet light has prevented CTFE/VDF copolymers from being used in outdoor applications.

For applications demanding a fluoropolymer, exceptional physical properties are required. Examples of these applications include aircraft textile coatings, stadium domes, industrial wall coverings, and awnings. For architectural stadium dome applications, for example, the following properties are required (Coatings Technology Handbook, "Architectural Fabrics" (D. Satas ed., Marcel Dekker, Inc. New York, (1991) 717): (1) non-flammability is required to meet very demanding building codes, with a limited oxygen index (ASTM D2863) greater than 90% (the minimum percentage of oxygen in the atmosphere to support combustion of a material) being preferred; (2) resistance to smog and other environmental pollutants (the material must be self-cleaning by exposure to rain water); (3) inert to all types of microorganisms; (4) UV resistant; (5) abrasion resistant; and (6) the composite should have a solar light transmission ASTM E424) adequate for the growth of grass.

Chlorotrifluoroethylene has been copolymerized with a large number of non-fluorinated olefins to produce coating compositions, both solvent borne and waterborne. These non-fluorinated olefins include as examples the vinyl ether copolymers disclosed by U.S. Pat. Nos. 5,200,480 and 5,304,617; the vinyl ester copolymers disclosed by U.S. Pat. No. 4,631,326 and the ethylene compolymers, disclosed by published Japanese Patent Application No. 208,969-1992. The use of significant levels of a non-fluorinated olefin will degrade many of these properties, particularly the non-flammability of the composition.

For many demanding applications requiring the use of a fluoropolymer, CTFE/VDF copolymers have many advantages over the perfluorinated polymers. In contrast to polytetrafluoroethylene which has poor abrasion resistance and low solar light transmission, polymers of CTFE and CTFE/VDF are abrasion resistant and when formed into a film have >90% solar light transmission. CTFE/VDF copolymers have many fabricating advantages over PTFE, polytetrafluoroethylene-hexafluoropropylene copolymers (FEP) and polytetrafluoroethylene-hexafluoropropylene-vinylidenefluoride (THV, manufactured by Dyneon) terpolymers. CTFE/VDF copolymers can be processed at mild temperatures and can be easily recoated by successive coatings of aqueous CTFE/VDF copolymer dispersions. Because CTFE/VDF copolymers have a higher surface tension than PTFE, FEP, and THV, recoating with successive passes of CTFE/VDF copolymers can be accomplished with very low levels of wetting agents, 0.1–2 weight % being typical depending on whether the wetting agent additive is fluorinated, perfluorinated, or non fluorinated, or any mixture thereof. PTFE, for example, is typically processed after adding 5–10 weight % of a non-ionic wetting agent from 300–375° C., which releases large quantities of decomposed surfactant into the oven coating towers. CTFE/VDF copolymers are excellent film formers which facilitates the production of dispersion cast film for lamination onto fabric, or the direct coating/recoating of fabric to a desired thickness with low levels of wetting agents.

CTFE/VDF copolymers are disclosed by McCarthy et al., *Proceedings of the Twenty-Fifth International Water-Borne, High Solids & Powder Coatings Symposium* 541 Feb. 18–20, (1998) and Bringer, *Encyclopedia of Polymer Science and Technology* ($1^{th}$ ed., vol. 7, Interscience Publishers, New York, 1967) p. 204, and by International Patent Publication Nos. WO 97/11979 and WO 97/17381. However, polymers of CTFE and CTFE/VDF as described by the prior art do not satisfy all of the criterions of a stadium dome textile coating/laminate, particularly UV resistance.

Prior art fabric coatings used in outdoor applications consisted of polyvinyl chloride, acrylics, PVDF, PVF, polyurethane, and rubbers such as neoprene. These materials suffered from being either too flammable, UV sensitive, susceptible to morphological changes, poorly adhesive to substrates (which is a current problem for PVF in the manufacture of awnings), or in some cases not sufficiently translucent.

For very demanding applications in which the composite is required to be load bearing, PTFE-coated fiberglass emerged in the 1970s as the material of choice. In load bearing structures such as stadium domes, wherein the coated glass fabric must meet the previously described requirements, it must above all perform as a material of construction. Load bearing structures such as stadium domes must survive the handling encountered during construction, as well as installation loads, prestress loads, and live loads including wind shear. The structures are prestressed to a certain tension and elongation, so that they are more resistant to further stresses.

These types of architectural fabrics are typically designed so that the maximum load the fabric will encounter once installed is no greater than 25% of the maximum tensile breaking strength of the fabric. For these reasons, it is very important that the polymer used in making the composite, whether it is laminated onto the glass fabric or impregnated into the fabric, must show little or no change in its mechanical or physical properties over the course of the thirty to fifty years the fabric might be in place. PTFE has satisfied these requirements, but has a large drawback because it produces composites with poor solar light transmission that do not support the growth of natural grass, requiring the use of artificial turf.

Copolymers of CTFE and VDF are disclosed by McCarthy et al., *Proc. 25 $^{th}$, Inter. Waterborne, High Solids & Powder Coat. Symp.*, 541 (Feb. 18–20 1998). However, CTFE/VDF copolymers having significant levels of crystallinity do not satisfy these requirements. There remains a need for polymer compositions that satisfy the previously described physical properties.

DETAILED DESCRIPTION OF THE PREFERRED EMBODIMENTS

Figure 1:
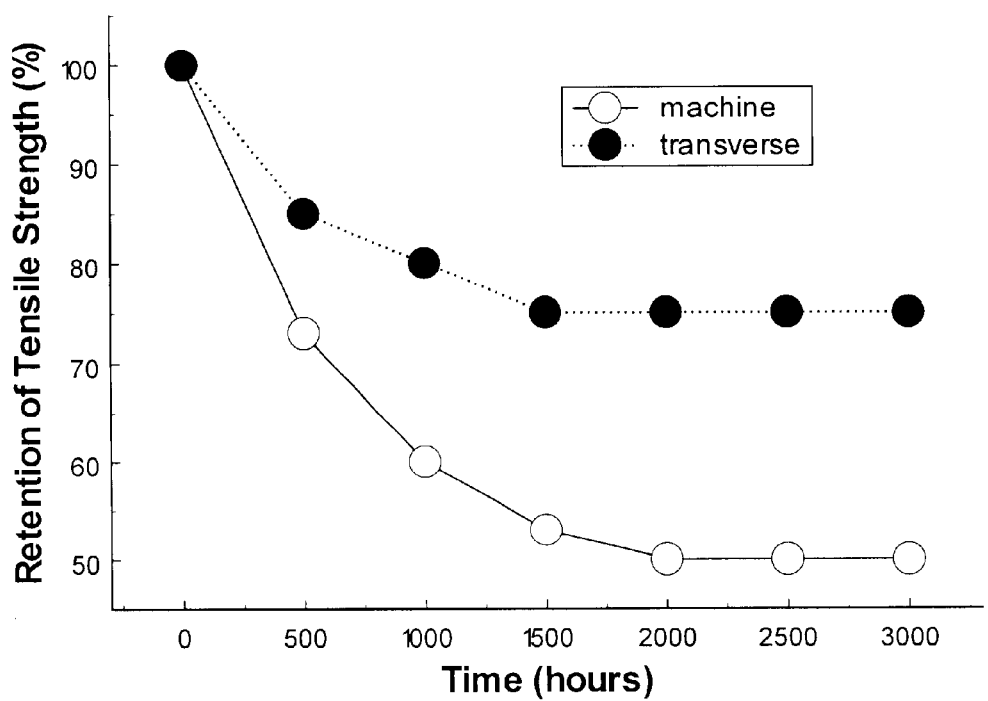
FIG. 1 depicts the change in the tensile properties of a prior art CTFE/VDF copolymer film with increasing UV exposure time.

The compositions of the present invention are significantly or completely amorphous chlorofluoropolymer compositions that resist ultra-violet (UV) light-induced embrittlement. The chlorofluoropolymer composition is in the form of an aqueous dispersion containing spherical chlorofluoropolymer particles. General particle sizes of from about 0.05 microns to about 1 micron having a weight average molecular weight greater than about 1,000,000 daltons are obtained in this invention.

Significantly, it has been found that polymer molecular weight ranges that are practical for the extrusion of chlorofluoro-olefin pellets and films are not best suited to produce UV-resistant coatings. Extrusion grades of such polymers are typically produced having a weight-average molecular weight between about 300,000 and about 600,000 daltons. Molecular weights above this only extrude with extreme difficulty, with temperatures greater than 300° C. and shear being necessary to overcome the high melt viscosity. Extrusion is often accompanied by significant molecular weight degradation, with a decrease in molecular weight of one-half being typical. Unfortunately, coating compositions containing polymers within the aforesaid molecular weight range are more subject to embrittlement upon UV exposure, even before degradation.

Dispersion cast film can be prepared from ultrahigh molecular weight polymers that could not be otherwise formed by melt extrusion. When coalescing emulsion particles, entanglement of the chain ends between polymer particles is only needed, not a melt flow of the bulk. For aqueous dispersions of discrete submicron-sized particles, the minimum film formation temperature is the primary factor determining film formation. Coalescence is independent of polymer melt viscosity and polymer molecular weight.

Therefore, in accordance with this invention, there is provided a composition comprising a chlorofluoro-olefin copolymer having a crystallinity index less than about 10% and a weight-average molecular weight greater than about 1,000,000 daltons, said copolymer having at least two comonomer units of the formula:

CX$_2$CYA wherein each X is independently selected from H, Cl and F; Y is selected from H, Cl, F, O(CZ$_2$)$_n$CZ$_3$, (CZ$_2$)$_n$CZ$_3$, (OCZ$_2$CZ$_2$)$_n$CZ$_3$ and (O(CZ$_2$)$_n$)$_n$CZ$_3$, wherein each n is independently from about 1 to about 12 and each Z is independently selected from H, Cl and F; and A is selected from H, Cl and F; provided that for at least one comonomer unit, at least one of A, Y, either X or any Z is Cl. Aqueous dispersion cast films and substrate coatings of said chlorofluoro-olefin copolymer compositions do not increase in crystallinity upon exposure to UV light.

For purposes of this invention, the term "copolymer" means a polymer having at least two monomeric units. Polymer films and substrate coatings are defined as not increasing in crystallinity upon exposure to UV light if the crystallinity index remains below 10% after 10,000 hours of accelerated weathering testing with a Xenon Arc Weatherometer (Atlas) employing Automotive Test SAE J1960 JUN89, using an irradiance of 0.55 watts/m$^2$ and 31.6 KJ/m$^2$/day/ASTM G26, with alternate exposure to light and darkness and intermittent exposure to water spray.

Changes in crystallinity are highly undesirable because a corresponding change in the mechanical properties of the polymer occurs. For chlorofluoro-olefin copolymers, an increase in the weight percentage of crystalline domains leads to a substantial decrease elongation at break for these polymers as well as a decrease in tensile strength. Because the mechanical properties will vary with temperature and UV-induced morphological changes, for outdoor applications, polymers having a crystallinity index of no more than about 10%.

The crystallinity index of chlorofluoro-olefin copolymers can be conveniently measured as a function of time using a combination of wide and small angle X-ray diffraction, or can be inferred from tensile testing. Temperature and/or UV-induced embrittlement is caused by an increase in the size of crystalline domains and lamella spacing. Chlorofluoro-olefin copolymers can be highly crystalline, semicrystalline, or amorphous, depending on the thermal history of the polymer, and the composition of the polymer. The crystallinity index is a measure of polymer crystallinity and is obtained from wide-angle X-ray diffraction, by separating a wide angle X-ray scan between 10 degrees and 22 degrees, 2θ, into an amorphous halo and crystalline peaks, and calculating the ratio of the area under the crystalline peaks to the total area.

Without being bound by any particular theory, it is believed that the high molecular weight of the copolymers restricts the polymer chain mobility and limits UV-induced crystallization that would otherwise cause the formation of large, brittle spherulites, and any other morphological changes. It is also believed that the high molecular weight decreases the copolymer's tendency to creep. Other benefits of the high polymer molecular weight include improved solvent resistance and increased toughness, in particular, the copolymers have a higher modulus and tensile strength and are more abrasion resistant.

CTFE-VDF copolymers having greater than 9 weight % VDF dissolve in various solvents including tetrahydrofuran. Comparable ultrahigh molecular weight compositions show significantly less solubility, only showing some signs of swelling with similar dissolution times.

For purposes of the present invention, the molecular weight of the polymers disclosed herein were calculated by preparing a series of CTFE/VDF copolymers having a range of molecular weights, zero shear viscosities, and intrinsic viscosities. Using the Mark Houwink relationship:

$$[\eta_{int}] = 6.15 \times 10^{-5} (M_n)^{0.74}$$

(S. Chandrasekaran, *Encyclopedia of Polymer Science and Technology*, (2nd ed., vol. 3, John Wiley and Sons, New York, (1985) 463) the molecular weights of some low molecular weight CTFE/VDF copolymers (Mw=30,000–1,000,000) were calculated from their intrinsic viscosity. The zero shear viscosity of a given polymer could then be correlated to the molecular weight by the following relationship:

$$\log \eta_o = -13.501 + 3.289 \log M_w$$

All of the materials used to make the chlorofluoro-olefin copolymers of the invention are commercially available. The chlorofluoro-olefin copolymer is essentially amorphous, having less than about 10% by weight of crystalline domain, and a glass transition temperature from about −10° C. to about 100° C., preferably from about 10° C. to about 80° C., and more preferably from about 20° C. to about 60° C.

At least one comonomer from which the copolymer composition is prepared is a chlorofluoro-olefin. Suitable chlorofluoro-olefins include partially and perchlorofluorinated olefins such as CTFE, 1,2-chlorodifluoroethylene, and 1-chloro-1-fluoroethylene, perchlorofluoroethers and perchlorofluorodioxoles.

Copolymer compositions may be prepared from up to three different chlorofluoro-olefin comonomers. Alternatively, one or two chlorofluoro-olefin co-monomers may be copolymerized with one or two fluoro-olefins. Suitable fluoro-olefin comonomers from which the copolymer composition may be prepared have the formula $CX_2CYA$, wherein X, Y and A do not include Cl but otherwise are as defined above. Preferred fluoro-olefin comonomers include partially and perfluorinated olefins such as VDF, TFE, HFP, vinylfluoride and 1,2-difluoroethylene, fluorinated alpha-olefins such as 3,3,4,4,4-penta-fluoro-1-butene, perfluoroethers such as perfluoro(propylvinylether) and perfluorodioxoles such as perfluoro(1,3-dioxole) and perfluoro(2,2-dimethyl-1,3-dioxole).

Preferred copolymers contain predominantly chlorotrifluoroethylene, and at least one fluoro-olefin selected from the group: VDF, hexafluoropropylene, tetrafluoroethylene, vinylfluoride, trifluoroethylene, and fluorinated or perfluorinated alkylvinylethers such as perfluoro propylvinylether. In a more preferred embodiment, the comonomers used to make the copolymer composition are selected from CTFE, VDF and a fluorinated vinyl ester. In an even more preferred embodiment, the comonomers have the formula $CX_2CYA$, wherein X, Y and A are as defined above, excluding olefins in which each X and A are hydrogen, provided that at least one comonomer unit contains a chlorine atom. In a particularly preferred embodiment, the comonomers used to make the copolymer composition are CTFE and VDF.

The copolymer compositions may optionally include a chloro-olefin comonomer. Essentially any chloro-olefin may be employed, and among the suitable chloro-olefins are vinylidene chloride and vinyl chloride.

The copolymer compositions may also optionally include a non-halogenated vinyl ester comonomer in addition to the halogenated olefins, provided that at least two halogenated olefin comonomers are employed. The vinyl ester is preferably an alkyl vinylester, in which the alkyl ester group contains from about 1 to about 12 carbon atoms. The vinylester comonomers are all commercially available.

Preferred vinyl esters include vinyl acetate, vinyl proprionate, vinyl butyrate, vinyl isobutyrate, vinyl hexoate, vinyl stearate, neononanoate ethenyl ester (Shell Chemical Company), vinyl esters of the acid n-valeric, caproic, lauric, versatic, isovaleric, 2-ethyl hexanoic, 2,2-dimethyl octanoic, 2-methyl-2-propyl pentanoic and 4-methyl-4-butyl hexanoic, as well as neoacid vinylesters such as EXXAR neovinylester available from the Exxon Corporation.

The copolymerization of vinyl esters with fluoro-olefins is known in the art. U.S. Pat. Nos. 3,451,978; 3,531,441; 3,318,850 and 3,449,305 describe the copolymerization of either vinyl fluoride (VF) or VDF with some quantity of a vinylester. In each of these embodiments the major component is VF or VDF, another component is TFE, and the third component is selected from a group including a vinylester. The disclosures of all four patents are incorporated herein by reference.

U.S. Pat. Nos. 3,380,971; 3,380,974 and 3,445,434 also disclose compositions containing a fluoro-olefin, a hydrocarbon-based olefin and a vinylester. Examples of hydrocarbon olefins include ethylene and isobutylene, which are quite flammable monomers. Polymers including these monomers would not be sufficiently non-flammable for the applications envisioned herein.

The amount of vinylester incorporated into the polymer must be carefully considered. Polyvinyl acetate, for example, is known to be a cross linking polymer when irradiated with ultraviolet light, such that initially an increase in molecular weight is observed (Lindesman, (*Encyclopedia of Polymer Science & Technology*, (Interscience Publishers, 1971, New York) pg 647)). The presence of oxygen and moisture and ultraviolet light will also promote polymer degradation, so that self-cross linking and degradation will be competitive processes. Consequently, when high levels of vinylester are incorporated into a polymer, changing mechanical properties with UV exposure can be anticipated. High levels of cross linking will result in a decreasing elongation at break and possible embrittlement. High levels of vinylester will also be more flammable. In addition, because chlorofluoro-olefins polymerize with vinyl esters in an alternating fashion, high levels of vinylester may lead to undesirable high levels of crystallinity. For these reasons, low levels of vinylester are employed.

Vinyl propionate and vinyl butyrate are most preferred. Vinyl propionate is a partially water-soluble olefin which accelerates the emulsion polymerization of chlorofluoro-olefins and fluoro-olefins. Because of the slightly branched nature of Vinyl propionate, it also slows crystallization and the formation of large spherulites, while not preventing their formation.

Non-halogenated olefins such as ethylene or propylene can also be incorporated into the polymer. Their presence, however, would subtract from the otherwise non-flammable properties of chlorofluoro-olefin copolymers. The non-halogentated olefins used to make the copolymer compositions of the invention are also commercially available.

The amount of each monomeric unit used to prepare the copolymer will depend to a great extent on the application in which the material will be used (e.g., a room temperature application generally requires a composition with a glass transition temperature close to room temperature). In the case of chlorofluoro-olefins, generally, increasing levels of comonomer leads to decreasing glass transition temperatures. One skilled in the art can readily and without undue experimentation optimize these ranges to obtain an essentially amorphous chlorofluoropolymer composition having the desired properties.

Preferred polymers contain less than about 90 weight % of a chlorofluoro-olefins, up to about 30 weight % of a fluoro-olefin, and from about 0 to about 10 weight % of a vinylester and/or a non-fluorinated olefin. When the comonomers used to make the copolymer composition are CTFE and VDF, the CTFE is present in an amount of from about 70 to about 85 weight %, preferably from about 76 to about 84 weight %, and most preferably from about 78 to about 84 weight %. When the comonomers used to prepare the copolymer composition are CTFE, VDF and a vinylester, the vinylester is present in an amount of from about 0.1 to about 5 weight %, and preferably from about 0.5 to about 3 weight %, the VDF component is present in an amount of from about 5 to about 25 weight %, and preferably from about 10 to about 25 weight %, and the CTFE component is present in an amount less than about 88 weight %, and preferably less than about 85 weight %.

Polymers having less than about 70 weight % CTFE are less desirable because the polymer will be increasingly more flammable with decreasing weight % CTFE. In addition, polymers having greater than about 25 weight % of a comonomer(s) such as VDF will have a less than desirable modulus, and potentially will have, depending on the comonomer, too low of a glass transition temperature, which may result in the polymer being too tacky at room temperature and having a tendency to pick up dirt. Secondly, non-cross linked polymers having less than about 70% CTFE might be more susceptible to creep when a static load is applied, as is the case of tensioned architectural membranes, depending on the comonomers used.

Polymers containing large quantities of a fluoro-olefin such as VDF (PVDF has a limited oxygen index=43%) would be substantially more flammable than that which would be acceptable for the applications which are disclosed herein. For this reason, chlorofluoro-olefins are present as the largest polymer component by weight because of their inherent non-flammability. PCTFE homopolymer has a limited oxygen index rating of 100%. The CTFE/VDF/ vinylester compositions disclosed herein have a limited oxygen index of 93% which is comparable to PTFE (>95%), yet significantly higher than poly(ethylene-TFE) (30%), and poly(CTFE-ethylene) (60%).

The copolymers of the invention have a crystallinity index from 0 to about 10%. Polymers having a crystallinity index of no greater than 5% are most preferred.

For copolymer compositions consisting of an aqueous dispersion of 0.05 to 0.5 micron spherical emulsion particles, weight-average molecular weights between about 2,000,000 and about 20,000,000 daltons are preferred. Weight-average molecular weights less than 10,000,000 daltons are typical, with a weight-average molecular weight of about 8,000,000 daltons being most preferred.

For the copolymer compositions in which chlorofluoro-olefin and fluoro-olefin comonomers have been copolymerized with a vinylester, weight-average molecular weights will range between about 600,000 and about 20,000,000 daltons, with a weight-average molecular weight between about 1,000,000 and about 10,000,000 daltons being typical. A weight-average molecular weight of about 8,000,000 daltons is again most preferred.

Compositions of copolymer containing chlorofluoro-olefin and fluoro-olefin comonomers copolymerized with vinyl esters have intrinsic viscosities/solution viscosities that are inconsistent with compositions of the copolymers containing only chlorofluoro-olefin and fluoro-olefin monomers, suggesting that the Mark Houwink coefficients are very different for the polymers containing a vinylester. Measurements of melt viscosities are necessary to estimate the molecular weights of copolymers containing vinylester comonomers. However, the presence of small quantities by weight of vinylester (1–5 weight %) can be neglected for zero shear viscosity measurements.

The copolymers of the present invention are polymerized by essentially conventional free-radical polymerization methods. Any commercially available radical initiator may be used in the present invention. Suitable candidates include thermal initiators and oxidation-reduction or "redox" initiator systems. Thermal initiators include: metal persulfates like potassium persulfate and ammonium persulfate; organic peroxides or hydroperoxides such as diacyl peroxides, ketone peroxides, peroxyesters, dialkyl peroxides and peroxy ketals; azo initiators such as 2,2'-azobisisobutyronitrile and water-soluble analogues thereof; and mixtures of any of the foregoing.

Any redox initiator system known to be useful in the preparation of fluoropolymers such as PCTFE may be used in the present invention. Typical redox initiator systems comprise: 1) an organic or inorganic oxidizing agent or mixtures thereof; and 2) an organic or inorganic reducing agent or mixtures thereof. Suitable oxidizing agents include metal persulfates such as potassium persulfate and ammonium persulfate; peroxides such as hydrogen peroxide, potassium peroxide, ammonium peroxide, tertiary butyl hydroperoxide ("TBHP") (($CH_3$)$_3$COOH), cumene hydroperoxide, and t-amyl hydroperoxide; manganese triacetate; potassium permanganate; ascorbic acid and mixtures thereof. Suitable reducing agents include sodium sulfites such as sodium bisulfite, sodium sulfite, sodium pyrosulfite, sodium-m-bisulfite ("MBS") ($Na_2S_2O_5$) and sodium thiosulfate; other sulfites such as ammonium bisulfite; hydroxylamine; hydrazine; ferrous irons; organic acids such as oxalic acid, malonic acid, citric acid and mixtures thereof.

The preferred free radical initiating system is one that serves to simultaneously emulsify the polymer while initiating the polymerization, thus eliminating the need for large quantities of surfactants. Redox initiator systems are the preferred radical initiator for the invention.

Preferred redox initiator systems use an MBS reducing agent and a TBHP oxidizing agent. In a more preferred embodiment, the redox initiator system is used in conjunction with a transition metal accelerator. Accelerators can greatly reduce the polymerization time. Any commercially available transition metal may be used as an accelerator in the invention. Preferred transition metals include copper, silver, titanium, ferrous iron and mixtures thereof. Ferrous iron is most preferred.

The amount of radical initiator used in the process depends on the relative ease with which the various monomers copolymerize, the molecular weight of the polymer and the rate of reaction desired. Generally, from about 10 to about 100,000 ppm of initiator may be used, although from about 100 to about 10,000 ppm is preferred.

Optionally, in order to further accelerate the polymerization, the redox initiator system may include additional peroxide-based compounds. The amount of additional peroxide-based compound used ranges from about 10 to about 10,000 ppm and preferably from about 100 to about 5,000 ppm.

The radical initiator may be added before, simultaneous with and/or shortly after the addition and/or consumption of the monomers used to make the copolymer. When an additional peroxide-based compound is used it may be added at the same interval specified for the primary radical initiator.

The amorphous chlorofluoropolymer compositions of the invention may be made by a two-step polymerization reaction. In its most simplified form, monomers, water and an initial charge of radical initiator are introduced into suitable polymerization vessel. Additional monomer is added throughout the reaction at a rate equal to the rate of consumption to maintain a constant pressure. Incremental additional charges of initiator are introduced into the vessel over the duration of the reaction to sustain the polymerization. The reaction mixture is maintained at a controlled temperature while all reactants are being charged to the vessel and throughout the polymerization reaction.

The only requirement for the reaction vessel used to prepare the compositions of the invention is that it be capable of being pressurized and agitated. Conventional commercial autoclaves which can be sealed and pressurized to the required reaction pressures (preferably in excess of 3.36 MPa (500 psig) for safety considerations) are preferred. Horizontally inclined autoclaves are preferred to vertically inclined autoclaves, although both geometries can be used.

The aqueous medium in which the polymerization is conducted is deionized, nitrogen-purged water. Generally, an amount equivalent to approximately half the capacity of the autoclave is used. The ratio of polymer to water is chosen in such a way to obtain a dispersion of about 20 to about 60% polymer solids in water. The water is precharged to the autoclave. The process is a surfactant-free emulsion polymerization process that does not require a separate post-concentration step to obtain high levels of emulsified polymer in water.

The monomers may be charged to the reactor vessel either in a semicontinuous or a continuous manner during the course of the polymerization. "Semicontinuous" means that a number of batches of the monomers are charged to the reactor during the course of the polymerization reaction. The batch size is determined by the desired operating pressure. The molar ratio of total monomer consumed to radical initiator will depend upon the overall particle size and molecular weight desired. Preferably, the overall mole ratio of monomer to initiator would be from about 10 to about 10,000, more preferably from about 50 to about 1,000, and most preferably from about 100 to about 500 moles of total monomer to one mole of initiator.

The radical initiator is generally added incrementally over the course of the reaction. For purposes of this discussion, "initial charge" or "initial charging" of initiator refers to a rapid, large, single or incremental addition of initiator to effect the onset of polymerization. In the initial charge, generally between about 10 ppm/min to about 1,000 ppm/min is added over a period of from about 3 to about 30 minutes, either before, after, or during the charging of the monomers. "Continuous charge" or "continuous charging" means the slow, small, incremental addition of initiator over a period of from about 1 hour to about 6 hours, or until polymerization has concluded. In the continuous charge, generally between about 0.1 ppm/min to about 30 ppm/min of initiator is added.

During the initiation of the polymerization reaction, the sealed reactor and its contents are maintained at the desired reaction temperature, or alternately to a varying temperature profile which varies the temperature during the course of the reaction. Control of the reaction temperature is another important factor for establishing the final molecular weight of the chlorofluoropolymers produced. As a general rule, polymerization temperature is inversely proportional to product molecular weight. Typically, the reaction temperature should range between about 0° C. to about 120° C., although temperatures above and below these values are also contemplated. The reaction pressure is preferably between from about 172 KPa to about 5.5 MPa, and more preferably from about 345 KPa to about 4.2 MPa. Elevated pressures and temperatures will yield greater reaction rates.

The polymerization must be conducted under agitation to ensure proper mixing. An adjustment of the agitation rate during the polymerization may be necessary to prevent premature coagulation of the particles. Although the agitation rate and reaction time will typically depend upon the amount of chlorofluoropolymer product desired, one of ordinary skill in the art can readily optimize the conditions of the reaction without undue experimentation to get the claimed results. The agitation rate will generally be in the range of from about 5 to about 800 rpm and, preferably from about 25 to about 700 rpm, depending on the geometry of the agitator and the size of the vessel. The reaction time will generally range from about 1 to about 24 hours, and preferably from about 1 to about 8 hours.

The chlorofluoropolymers produced using the above surfactant-free process are self-emulsifiable chlorofluorinated macromolecules having inorganic, "surfactant-like" functional end groups that impart excellent latex stability to the polymer when present in very low concentration. The chlorofluoropolymers produced are thereby dispersed in the aqueous medium by the attachment of these inorganic fragments onto the end of the polymer repeating units, thus creating a surface active agent having both a hydrophobic component and a hydrophilic component. This attachment leads to micelle formation, or, if the concentration of functionalized end groups is high enough, to their complete dissolution in water.

The type of "surfactant-like" end groups produced depends upon the type of initiator system selected and the optional addition of compounds that might be incorporated into the polymer through chain transfer reactions. Examples of such emulsifying function end groups include, but are not limited to, sulfonates, carboxylates, phosphonates, phosphates and salts and acids thereof, ammonium salts and any mixture thereof.

The presence of sulfonic acid end groups most significantly affect the emulsification of the chlorofluoropolymers in water. The amount of these functional end groups in the dispersion can be determined by first purifying the dispersion by methods known to the art, such as by ion exchange or dialysis, titrating the dispersion with any known base such as aqueous sodium hydroxide or ammonium hydroxide, and then expressing the amount in terms of molar equivalents of titrated base. The amount of these functional end groups expressed in moles of equivalent NaOH may range between from about 0.0001 to about 0.5 moles of functional end groups per liter of chlorofluoropolymer dispersion obtained. The molar ratio of these functional end groups per fluoropolymer produced may range from about 1:10 to 10,000, preferably from about 1:10 to 1,000 and more preferably from about 1:50 to 500. A typical chlorofluoropolymer dispersion within the scope of this invention contains about 0.01 molar equivalents/kg of dry polymer.

In the absence of added surfactant, the resulting particle size distribution of the dispersion produced according to the process of the invention will be monodisperse and narrow. "Monodisperse distribution" as used herein means a single distribution of particle sizes. Generally, the particle distribution ranges between about 0.1 microns and about 0.4 microns, and more preferably from about 0.1 to about 0.3 microns.

The dispersions of the present invention are prepared using a surfactant-free emulsion process to obtain stable dispersions having up to 40 weight % solids in water, which is obtained without a concentration step. Low levels of surfactants are added if further particle size control is desired, or to obtain higher levels of emulsified polymer in water (i.e., 40–60 weight %). Essentially any commercially available surfactant may optionally be pre-charged or added batchwise during or subsequent to the onset of polymerization to further manipulate particle size, particle number and particle distribution. It is well known that the addition of more surfactant during the course of polymerization to emulsions already containing surfactants sometimes creates new particles and thus produces a bimodal distribution of particles or a broad distribution of particles.

Suitable surfactants will readily occur to those skilled in the art and include anionic, cationic and nonionic surfactants. The preferred dispersion is an anionic surfactant stabilized latex emulsion having from 0 to 0.25 weight % of an anionic emulsifier.

Perfluorinated anionic surfactants are preferred. Examples of suitable perfluorinated anionic surfactants include perfluorinated ammonium octanoate, perfluorinated alkyl/aryl ammonium (metal) carboxylates and perfluorinated alkyl/aryl lithium (metal) sulfonates wherein the alkyl group has from about 1 to about 20 carbon atoms. Suitable surfactants also include fluorinated ionic or nonionic surfactants, hydrocarbon-based surfactants such as the alkylbenzenesulfonates or mixtures of any of the foregoing.

The chlorofluoropolymers produced by the process of the invention may be isolated by conventional methods such as evaporating the water medium, freeze-drying the aqueous suspension, or adding a minor amount of an agglomerating or coagulating agent such as ammonium carbonate, followed by filtration or centrifuging. Alternatively and preferably the chlorofluoropolymer dispersion produced is used as is.

When formulating the dispersion for various applications such as paints, coatings and adhesives, it may be desirable to include additional components. In one embodiment wherein a coating formulation having a low minimum film formation temperature is desired, coalescing aids and/or cosolvents may be added to the dispersion. Suitable coalescing aids include, but are not limited to, diethylene glycol, monobutyl ether ("butyl carbitol"), ethylene glycol monobutyl ether ("butyl cellusolve"), methyl cellusolve and isopropyl cellusolve.

Fast coalescing aids such as ethylene glycol monopropyl ether, propylene glycol monobutyl ether, propylene glycol n-propyl ether, dipropylene glycol methyl ether, propylene glycol and ethylene glycol, and esters such as ethyl acetate, carbitol acetate, cellusolve acetate, n-butylacetate, diethylene glycol ethyl ether acetate, dipropylene glycol methyl ether acetate, 3-ethyl ethoxy propionate and propylene glycol ethyl ether acetate may also be used. Likewise, slow coalescing agents such as 2,2,4-trimethyl-3-pentanediol monoisobutyrate available from Eastman Chemical Products under the trade name "Texanol" may also be used. Suitable organic cosolvents for the dispersion include, but are not limited to, isopropanol, n-methylpyrolidinone, dioxane propylene carbonate, and mixtures thereof. Ethylene glycol and propylene glycol are cosolvents that are particularly useful as antifreeze agents.

Depending upon the application desired, other components may also be included, such as wetting and leveling agents such as octylphenoxypolyethoxyethanol; pigments such as titanium dioxide; thickeners such as hydrophobe modified alkali swellable emulsions (HEURASE); defoamers; UV absorbers; plasticizers such as butyl benzylphthalate; biocides; fillers such as glass beads from 0.1–200 microns in size, as well as nanospheres; stain resists such as aqueous PTFE or fine powder PTFE, and the like. See, e.g., *Handbook of Organic Coatings; A Comprehensive Guide for the Coatings Industry* (NY 1990) or *Handbook of Coatings Additives*, (NY 1987).

Unlike other fluoropolymers which must be processed at extreme temperatures (i.e., PTFE, FEP, etc.), dispersions of chlorofluoro-olefin/fluoro-olefin copolymers of the present invention and the vinylester terpolymers thereof can be coated at mild temperatures onto essentially any substrate, including, but not limited to, plastic substrates, to confer non-flammability, stain and soil resistance, weatherability, inertness to microorganisms, chemical resistance, moisture resistance, tear resistance, abrasion resistance, and long term durability. The dispersion coating can confer these properties when coated onto any of the following fabrics, both natural or synthetic: cotton, wool, silk, polyester, acrylic, any polymer from the nylon family of polyamides, Kevlar® fiber fabrics (available from the Dupont Company), polyaramide, polyimide, fiberglass, polyolefin, polyethersulfone, polybenzoxazole (PBO), vinyl, carbon, graphite, high molecular weight polyethylene (Spectra® fiber fabrics, available from the Allied Signal Corporation), liquid crystalline polymer (polymers based on hydroxybenzoic acid and hydroxynapthoic acid), nonwoven or woven fabric, and Thurmount® fiber fabrics (available from the Dupont Company). Woven or nonwoven fabrics may contain any combination of these fibers, both natural and synthetic, and a combination of woven and nonwoven fabrics may be employed in one composite. Fibers can be continuous filament, stapled, or textured.

Fabrics can be heat cleaned or washed with any of a number of surfactants (soap) at elevated temperatures, to remove binders or sizing agents. The fabric can also be cleaned by the use of solvents. Heat cleaned fabrics are not, however, preferred, because heat cleaning often degrades the tensile strength of the fiber for load bearing applications requiring high tensile strength. Heat cleaning also reduces the amount of organics on the fiber without completely eliminating them, which can lead to yellowing under certain conditions.

The weave pattern can include any of the following weave patterns: plain, leno, mock leno, satin weave, twill, and basket weave. Glass fabrics are typically treated with a silane coupling agent finish (amino, hydroxy, vinyl, or epoxy substituted silane) prior to adding the final coating finishes in order to improve adhesion. Any adhesion promoter known in the art can be employed. For glass fabrics used in load bearing composites, the glass is first coated with a silane or silicon oil which protects the glass substrate from moisture and acts as a lubricant, with methylphenylsilicone oil (ET-4327 available from Dow Corning as an aqueous dispersion) being typical. This is described in U.S. Pat. No. 5,759,924, which is incorporated herein by reference.

The range of woven glass fabrics which can be coated using the aqueous dispersions disclosed herein is broad. Any of the glass fabrics described in the above-cited U.S. Pat. No. 5,759,924 can be coated, or a dispersion cast film can be laminated thereon. Because glass fiber has excellent tensile properties but poor compressive properties it is best to choose a fabric in which no component of the fabric is compressed when tensioned in a uniaxial or biaxial load. High tensile strength glass fabrics which show only positive elongation in all directions under biaxial loads are preferred. Glass fabrics having the largest windows between the fabric knuckles are preferred because this will result in a composite having the most desirable solar light transmission. This is also described in the above-cited U.S. Pat. No. 5,759,924.

As an alternative approach, it is often convenient to coat a substrate in a multipass process. In doing so, improved stain resistance can be obtained by adding any one of the additives previously mentioned to the top coat formulation. Aqueous dispersions of FEP, THV, PTFE, and PFA, can be conveniently added to the chlorofluoro-olefin/fluoro-olefin aqueous dispersions of the present invention and coated at the processing temperature necessary to fuse the chlorofluoro-olefin/fluoro-olefin particles as a top coat on top of a substrate previously coated with a chlorofluoro-olefin/fluoro-olefin. In this case the chlorofluoro-olefin/fluoro-olefin acts as a binder for the other fluoropolymer containing component, which serves to lower the surface energy of the final coat. It is particularly desirable to make the surface self-cleaning. Alternatively, a low surface energy top coat can be obtained by melt lamination. Dispersion cast films can be prepared from the previously described aqueous blends, after which the film can be laminated on top of the coated surface. In addition, FEP (available from Dupont), THV (available from Dyneon), or PFA (available from Dupont, TE-9946) melt extruded film can be laminated onto the coated surface to impart a self-cleaning surface. All of these methods are well-known to those of ordinary skill in the art.

The product of the polymerization process of the invention may be used unaltered, in its aqueous dispersion form, in a number of other applications. The dispersion may be used as an additive for: polishes (see Gehman, U.S. Pat. No. 4,150,005 which disclosure is incorporated herein); concrete (to provide moisture barrier properties); sun screens; paints (binder for color) and inks (adds lubricity); protective coatings for metals (see Morgan et al., U.S. Pat. No. 5,344,867 which disclosure is incorporated herein); fabrics; multilayer film structures (see Effenberger et al., U.S. Pat. No. 5,141,800, which disclosure is incorporated herein), and original equipment manufactured goods ("OEM"). Examples of OEM equipment include, but are not limited to, coatings for vehicles (for air, land and sea) and appliances such as outdoor refrigeration units and machinery. The dispersions may also have application as deicing agents for aircraft. Methods for formulating aqueous dispersions in these applications are known to those skilled in the art.

Depending on the application and desired properties, it may be advantageous to blend the copolymer dispersions of the present invention with other water-borne polymer dispersions such as acrylic polymers and copolymers thereof, polyethylene acrylic acid compolymers, PVC, PVdC, vinylester-acrylics, vinyl esters, epoxies, polyacrylamides, polyethers such as poltetheretherketone ("PEEK"), PVdC-acrylics, olefin waxes or high polymers, polyurethanes and fluoropolymer dispersions such as PTFE, FEP, perfluorinated alkylvinylethers and polytetrafluoroethylene-hexafluoropropylene-VDF terpolymers, or any blends thereof. (See Martinez-Salazar et al., *J. Mater Sci.*, 26 2579–82 (1991).)

Applications for the chlorofluoro-olefin/fluoro-olefin fluoropolymer dispersions include: automotive (upholstery, undercar, inside door textile coating, airbags), aerospace (upholstery, carpet backing, wall covering), marine (sail cloth), architectural and industrial textile applications; roof membranes, awnings (illuminated or backlit), canopies, rug backings, curtain backings, parking lot covers, drapery backings, greenhouse fabrics, window shades, vertical blinds, acoustical facing fabrics, ceiling board fabrics, smoke and fire barrier fabrics, parachute harnesses, protective clothing (chemical, military), expansion joints, insulation, flexible ducting, tents, coated fabric tarpaulins, signage, conveyor belts (food, packaging, bulk), welding curtains, geomembranes, jacketing materials for pipes and ducts, upholstery and covers for trains and boats, truck curtains for securing and protecting loads, outdoor furniture (patio, deck, porch), gaskets, seals, gloves, and bag house filtration membranes. The fluoropolymer dispersions described herein can be coated onto a release substrate to a desired thickness, peeled off to yield a film, and then laminated onto various woven or nonwoven fabrics to meet the previously described applications.

EXAMPLES

For many outdoor applications, the aesthetic characteristics of the coating, film, textile, or composite must be preserved. Color (particularly a polymer's tendency to yellow), adhesion, clarity, and cleanability must be maintained. Color changes were determined with the CIELAB Color Scale using the three coordinates L*, a*, and b*. L*=lightness, from 100 for white to 0 for black; +a* indicates redness, −a* indicates greeness; +b* indicates yellowness, −b* indicates blueness. DE is a measure of color change and is calculated by the following equation: DE=the square root of $(L^*-L^*_o)^2+(a^*-a^*_o)^2+(b^*-b^*_o)^2$. The change in +b*, the yellow index is usually the most critical for applications where UV exposure occurs.

Using a Macbeth colorimeter, the yellow index of coated fiberglass composites and the dispersion cast films of the copolymers described herein show no significant changes with time. The samples start off modestly yellow/brown after initial processing. When coated onto fiberglass or a release substrate, the color bleaches out within the first 100–200 hours of UV exposure to yield a white fiberglass composite or colorless transparent film upon exposure to ultraviolet light. Because all of the samples bleach in the first 100–200 hours of UV exposure, calculations of DE are based on the first measurements taken after initial polymer bleaching.

Example 1

Exposure of Prior Art CTFE/VDF Copolymer Film to UV Radiation

Figure 2:
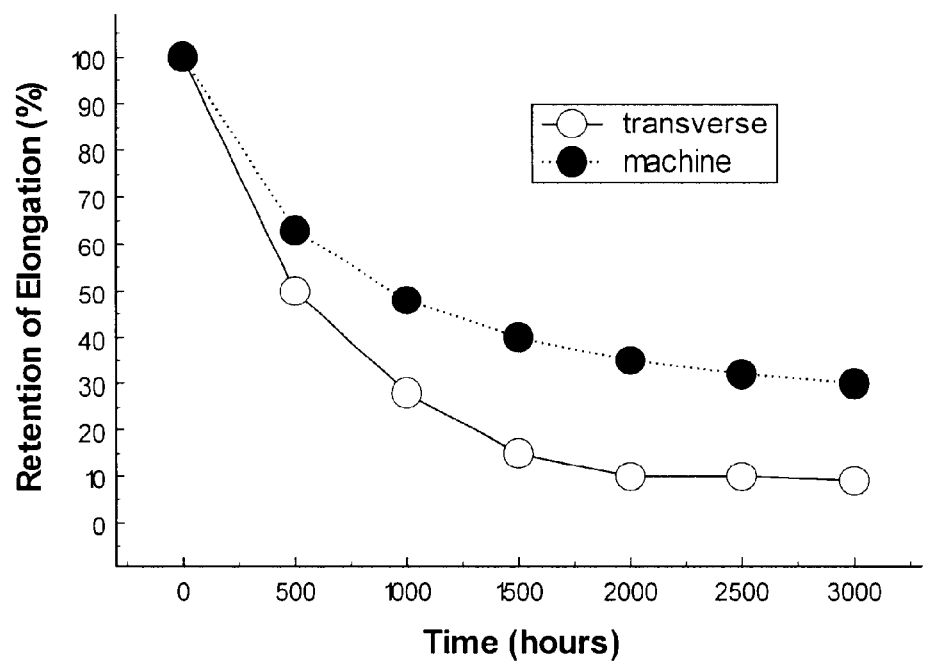
FIG. 2 depicts the change in elongation at break of the CTFE/VDF copolymer film with increasing UV exposure time.

FIGS. 1 and 2 show the deterioration of the tensile properties of a 1 mil CTFE/VDF copolymer film as a function of UV exposure (Model XW weatherometer), according to ASTM method E-4257. The polymer contained 3.5 weight % VDF. The molecular weight of the polymer was measured to be 288,857 daltons.

As shown by FIG. 1, rapid changes in the tensile properties of the CTFE/VDF copolymer film occurred after only 1500 hours of UV exposure. The loss of tensile strength would be catastrophic for architectural applications such as stadium domes wherein the composites are placed under constant tension and must withstand extreme wind shear.

FIG. 2 shows the decrease in the elongation at break of the same CTFE/VDF copolymer film with UV exposure. For many textile applications wherein a soft coating is applied onto a woven or nonwoven fabric, the flexibility, or hand of the composite, is of extreme importance to the customer. A loss of 90% of the elongation at break (transverse direction) after 3000 hours of UV exposure would result in a very brittle composite that would fail in the field.

Example 2

Preparation of Prior Art CTFE/VDF Copolymer Dispersion

A CTFE/VDF copolymer dispersion was prepared having the composition 91 weight % CTFE and 9 weight % VDF. A 10 gallon glass-lined autoclave was first filled with 5 gallons of water, then nitrogen sparged to remove oxygen. The autoclave was then filled with 2.28 Kg of CTFE and 0.22 Kg of VDF. 20.36 g of a 70% solution of tertiary butyl hydroperoxide (TBHP) polymerization initiator in water (30%) was further diluted to 100 mL with deionized water. 15.54 g sodium meta bisulfite (MBS) polymerization initiator and 2.25 g ferrous sulfate heptahydrate catalyst were also diluted to 100 mL with deionized water. The two solutions were separately added to the autoclave over a ten minute time period. The autoclave was maintained throughout the entire polymerization between 15–25° C. After addition of the initial catalysts, 300 mL of perfluorinated ammonium octanoate catalyst (20% active solids) was charged into the autoclave over a 10 minute time period. The polymerization was continued by the slow addition of two separate solutions consisting of 109 g of TBHP diluted to 750 mL with deionized water and 83 g MBS diluted to 750 mL with deionized water. The polymerization initiators were added at a rate of 1.8 mL/min. After consumption of the initial charges of CTFE and VDF, CTFE and VDF were added successively to the autoclave to maintain a reactor pressure from 50–130 psig. 18.2 Kg of CTFE and 1.8 Kg of VDF were added to the autoclave over a period of 5 hours). The autoclave was vented, yielding a polymer dispersion containing 47.9% polymer solids. A molecular weight ($M_w$) of 1,392,477 was calculated from a zero shear viscosity measurement of the dried polymer.

The dispersion was formulated into a coating by the addition of a nonionic wetting agent and a fugitive glycol based coalescing agent. The formulated dispersion was then coated onto a release substrate and fused at a temperature above its melting point to yield a dispersion cast film. The cast film was recoated a sufficient number of times to obtain a 1–2 mil film. The morphological (crystalline) properties of the polymer were evaluated following temperature and/or UV exposure (QUV-B) by wide angle X-ray diffraction as a function of time to characterize the polymer's tendency to embrittle.

| Hours of QUV-B | Hours Heated | Temperature/ °C | Crystallinity Index (%) | Crystallite Size & Perfection (nm) |
|---|---|---|---|---|
| none | none | | | 61 |
| none | 1000 | 45 | 37 | 85 |
| none | 2168 | 45 | 40 | 75 |
| none | 1000 | 70 | 43 | 90 |
| none | 2168 | 70 | 40 | 184 |
| 204 | 204 | 45 | 35 | 89 |
| 508 | 508 | 45 | 33 | 75 |
| 972 | 972 | 45 | 38 | 120 |
| 1994 | 1994 | 45 | 39 | 169 |
| 209 | 209 | 70 | 40 | 198 |
| 522 | 522 | 70 | 40 | 204 |
| 1001 | 1001 | 70 | 42 | 215 |
| 1999 | 1999 | 70 | 45 | 241 |

This example shows that at 70° C., in the absence of ultraviolet light, there is significant growth in crystallite size after only 2,168 hours of temperature exposure, and a significant increase in crystallinity after only 1,000 hours. At 45° C., the percent crystallinity of the polymer increases rapidly when exposed to the mild temperature, while the size of the crystallites remain constant. When the dispersion cast films are exposed to UV light and 45° C., it can be seen that the increase in polymer crystallinity occurs after only 204 hours, accompanied by the gradual increase in crystallite size and perfection over 1,994 hours. At 70° C. and exposure to UV radiation, the increase in percent crystallinity and crystallite size is immediate and severe. The increase in crystallinity and crystallite size is responsible for the gradual embrittlement of prior art CTFE based copolymers in outdoor applications.

Example 3
Preparation of CTFE/VDF/Vinyl Propionate Terpolymer Coating

A CTFE/VDF/Vinyl propionate terpolymer was prepared having 82 weight % chlorotrifluoroethylene, 16.3 weight % vinylidenefluoride, and 1.7 weight % Vinyl propionate. The polymer is amorphous (X-ray diffraction showed no crystallinity and no crystallite size can be detected). The polymer had excellent mechanical properties (good resistance to creep) from its high molecular weight.

To prepare the polymer, a 30 gallon glass lined autoclave was first filled with 22 gallons of water, and then nitrogen sparged to remove oxygen. The autoclave was then filled with 8.2 Kg of CTFE and 1.63 Kg of VDF. 80 g of a 70% solution of TBHP in water (30%) was further diluted to 500 mL with deionized water. 62.16 g MBS and 12.61 g ferrous sulfate heptahydrate was also diluted to 500 mL with deionized water. The two solutions were separately added to the autoclave as in Example 2. After 20 minutes into the polymerization, the Vinyl propionate was pumped into the autoclave throughout the polymerization at a rate equal to the consumption rate of CTFE and VDF. After consumption of the initial charges of CTFE and VDF, CTFE and VDF were added to the autoclave to maintain a reactor pressure from 50–130 psig. 67.24 Kg of CTFE, 13.366 Kg of VDF, and 1.394 Kg of Vinyl propionate were added to the autoclave. After consumption of all monomers, the autoclave was vented. The dried polymer had a molecular weight of 8,460,629, calculated from its zero shear viscosity, and was quite elastomeric.

Example 4
Coating of Glass Fabric Using Composition from Example 3

The pH of the dispersion from Example 3 was adjusted to 9.0 using a combination of lithium citrate and lithium carbonate. 2 weight % by polymer solids weight of a nonionic wetting agent was added to the latex. To this latex was added 0.8 weight % based on polymer solids weight of Acrysol ASE-60 (the Rohm & Haas Company), an acrylic acid based associative thickener, to obtain a viscosity of 200 centipoise, and 8 weight % ethylene glycol based on polymer solids. The dispersion was then coated onto a heavy woven fiberglass at 170° C. using multiple passes to achieve a thickness of 0.68 mm. The fiberglass composite was then exposed to accelerated weathering testing with a Xenon Arc Weatherometer (Atlas) employing Automotive Test SAE J1960 JUN89, using an irradiance of 0.55 watts/$m^2$ and 31.6 KJ/$m^2$/day/ASTM G26 (with alternate exposure to light and darkness and intermittent exposure to water spray).

| Exposure Time (hours) | Tensile Strength at break psi/ 1000 (machine) | Elongation at break (%) (machine) | Tensile Strength at break psi/1000 (transverse) | Elongation at break (%) (transverse) |
|---|---|---|---|---|
| 0 | 13.4 | 8.2 | 6.9 | 6.1 |
| 960 | 13.8 | 11.0 | 10.2 | 7.0 |
| 1976 | 17.0 | 9.6 | 20.4 | 9.2 |
| 3567 | 12.0 | 16.6 | 13.0 | 14.4 |
| 4575 | 12.5 | 9.4 | 11.3 | 8.0 |
| 5584 | 10.9 | 8.8 | 10.9 | 8.2 |

This example demonstrates that composites can be prepared which show no tendency to embrittle, in that there is no loss in elongation at break with UV exposure. There is additionally no loss in the tensile strength of the composite.

Example 5
Coating of a Release Substrate Using Coating Composition from Example 3

The coating composition of Example 3 was formulated with similar quantities of a coalescing agent and a higher level of thickener, as described in Example 4. The thickened coating was then coated in one pass onto a coated paper release film, a substrate typically used for vinyl plastisols at 180° C. to yield a 0.8 mil coating on the coated paper release film. Polyester or polyimide, or any other type of dimensionally stable film can also be used as a release film for the preparation of dispersion cast film. The polymer coated onto the release film was then peeled off and the polymer evaluated as an unsupported film, otherwise known as dispersion cast film. Five layers were stacked one on top of each other to yield a 4–5 mil thick laminate. The layers were sandwiched together in a holder and were later fused together by the temperatures that occurred during UV exposure. The dispersion cast film was exposed to accelerated weathering testing as in Example 4 and analyzed using a MacBeth Color-Eye 3100 colorimeter, giving the following results:

| Exposure (hr) | L* | a* | b* | DE |
|---|---|---|---|---|
| 331 | 95.551 | −.470 | 1.733 | |
| 669 | 95.063 | −.444 | 1.914 | 0.31 |
| 1345 | 94.343 | −.373 | 2.150 | 1.28 |
| 1679 | 93.994 | −.299 | 2.289 | 1.66 |
| 2021 | 92.913 | −.241 | 2.565 | 2.78 |
| 2653 | 93.111 | −.236 | 2.669 | 2.62 |
| 3228 | 92.590 | −.133 | 2.782 | 3.16 |
| 3947 | 91.724 | −.133 | 2.886 | 4.01 |
| 4277 | 92.192 | −.119 | 3.021 | 3.61 |
| 4611 | 91.853 | −.040 | 3.210 | 4.01 |
| 5961 | 91.378 | −.003 | 3.240 | 4.46 |

Although there is a time dependent increase in DE, which measures the total change color of the dispersion cast films, the color shift occurs predominantly along the L* scale. The yellow index is most critical for the applications envisioned for these coating compositions. Only a modest increase in the yellow index (b*) is observed after 5,961 hours of Xenon Arc exposure, a color shift which is not detectable by the human eye. The human eye cannot detect a yellow color at these low levels.

Example 6
Coating of Heat Cleaned Woven Glass Fabric Using Coating Composition from Example 3

The coating composition from Example 3 was formulated according to Example 4. The coating composition was knife coated onto open weave heat cleaned woven glass fabric, style 1800 from BGF Industries, Inc at 170° C. using 5 passes to thoroughly coat the glass. Samples were exposed to accelerated weathering testing as in Example 4, and analyzed using a MacBeth Color-Eye 3 100 colorimeter, giving the following results:

| Hours of Exposure | L* | a* | b* | DE |
|---|---|---|---|---|
| 354 | 92.250 | −1.414 | 4.687 | |
| 969 | 92.280 | −1.398 | 4.451 | 0.24 |

This example shows an almost negligible shift in color occurs with UV exposure for the coating composition when coated onto heat cleaned glass fabric.

Example 7
Coating of High Strength Woven Glass Fabric Using Coating Composition from Example 3

The coating composition from Example 3 was formulated according to Example 4 and knife coated onto specialty treated woven glass fabric, at 170° C. using 5 passes to thoroughly coat the glass. The fabric was not heat cleaned, in order to simulate stadium dome applications. The glass fabric was treated using a proprietary process to remove/pacify residual organic contaminants which make up the binder of the glass fabric as it is produced (lubricants such as wax, starch, polyvinylalcohol) without causing a decrease in the mechanical properties of the glass fabric reinforcement. This process also results in a woven fabric which does not yellow upon prolonged UV exposure. Samples were exposed to accelerated weathering testing as in Example 4, and analyzed using a MacBeth Color-Eye 3100 calorimeter, giving the following results:

| Exposure (hr) | L* | a * | b* | DE |
|---|---|---|---|---|
| 349 | 91.979 | −1.622 | 4.490 | |
| 662 | 92.079 | −1.572 | 4.016 | 0.49 |
| 998 | 91.960 | −1.486 | 3.878 | 0.63 |
| 1341 | 91.950 | −1.456 | 3.810 | 0.70 |
| 1671 | 91.954 | −1.472 | 3.818 | 0.69 |
| 2005 | 91.491 | −1.399 | 3.987 | 0.74 |
| 2355 | 91.522 | −1.364 | 3.970 | .074 |
| 3355 | 91.0885 | −1.264 | 4.155 | 1.023 |

This example demonstrates that glass fabric can be coated and show little change in with UV exposure, particularly with regard to the yellow index, b*.

Examples 8–21
Preparation of Other Fluoropolymer Dispersions

Examples 2 and 3 were repeated using each of the monomeric groupings reported in the following table:

| Example | Monomer Charge 1 (wt %) | | Monomer Charge 2 (wt %) | | Time (min.) | % Solids |
|---|---|---|---|---|---|---|
| 8 | CTFE | 87 | HFP | 13 | 406 | 41 |
| 9 | CTFE | 80 | VF | 20 | 308 | 47 |
| 10 | CTFE | 84 | perfluoropropylvinyl ether | 16 | 273 | 48 |
| 11 | CTFE | 81 | perfluoro-1,3-dioxole | 19 | 425 | 46 |
| 12 | CTFE | 80 | TFE<br>VDF | 10<br>10 | 294 | 51 |
| 13 | CTFE | 80 | TFE<br>HFP | 10<br>10 | 500 | 50 |
| 14 | CTFE | 78 | TFE<br>VF | 8<br>14 | 326 | 45 |
| 15 | CTFE | 84 | TFE<br>perfluoropropylvinyl ether | 4<br>12 | 308 | 43 |
| 16 | CTFE | 82 | TFE<br>VDF<br>vinyl butyrate | 6<br>9<br>3 | 275 | 52 |
| 17 | CTFE | 81 | HFP<br>VDF<br>vinyl butyrate | 10<br>5<br>4 | 384 | 39 |
| 18 | CTFE | 78 | HFP<br>vinyl butyrate | 19<br>3 | 465 | 37 |
| 19 | CTFE | 83 | VF<br>vinyl butyrate | 13<br>4 | 275 | 47 |
| 20 | CTFE | 78 | perfluoropropylvinyl ether<br>vinyl butyrate | 16<br>6 | 298 | 45 |
| 21 | CTFE | 82 | VDF<br>vinyl butyrate | 16<br>2 | 287 | 51 |

What is claimed is:

1. A composition comprising a chlorofluoro-olefin copolymer having a crystallinity index less than about 10% and a weight-average molecular weight greater than about 1,000,000 daltons, said copolymer having at least two comonomer units of the formula:

$$CX_2CYA$$

wherein each X is independently selected from the group consisting of H, Cl and F; Y is selected from the group consisting of H, Cl, F, $O(CZ_2)_nCZ_3$, $(CZ_2)_nCZ_3$, $(OCZ_2CZ_2)_n\ CZ_3$ and $(O(CZ_2)_n)_nCZ_3$, wherein each n is independently from about 1 to about 12 and each Z is independently selected from the group consisting of H, Cl and F; and A is selected from the group consisting of H, Cl and F; provided that for at least one comonomer unit, at least one of A, Y, either X or any Z is Cl.

2. The composition of claim 1, wherein said copolymer comprises at least one comonomer selected from the group consisting of chlorotrifluoroethylene, vinylidene chloride, vinyl chloride, 1,2-chlorodifluoroethylene, 1-chloro-1-fluoro-ethylene, perchlorofluoroethers and perchlorofluorodioxoles.

3. The composition of claim 2, wherein said copolymer comprises chlorotrifluoroethylene.

4. The composition of claim 1, wherein said copolymer comprises a chlorofluoro-olefin copolymerized with at least one fluorinated monomer.

5. The composition of claim 4, wherein said fluorinated monomer is selected from the group consisting of vinylidene fluoride, hexafluoropropylene, tetrafluoroethylene, vinylfluoride, trifluoroethylene, fluorinated alkylvinylethers, perfluorinated alkylvinylethers, 1,2-difluoroethylene, fluorinated alpha-olefins and perfluorodioxoles.

6. The composition of claim 5, wherein said copolymer comprises chlorotrifluoroethylene copolymermized with a fluorinated monomer selected from the group consisting of vinylidene fluoride, hexafluoropropylene, tetrafluoroethylene, vinylfluoride, trifluoroethylene, fluorinated alkyl vinyl ethers and perfluorinated alkyl vinyl ethers.

7. The composition of claim 6, wherein said copolymer comprises chlorotrifluoroethylene copolymerized with vinylidene fluoride.

8. The composition of claim 7, wherein said copolymer further comprises a fluorinated alpha olefin.

9. The composition of claim 4, wherein said copolymer further comprises a monomer selected from the group consisting of vinylesters and non-halogenated alpha-olefins.

10. The composition of claim 9, wherein said copolymer comprises a chloro-olefin copolymerized with at least one fluoro-olefin and an alkylvinylester.

11. The composition of claim 10, wherein said alkylvinylester is selected from the group consisting of vinylpropionate, vinylacetate, vinylbutyrate, vinylisobutyrate, vinylhexanoate, vinylstearate, neononanoate ethenyl ester, versatic acid vinylester, valeric acid vinylester, caproic acid vinylester, lauric acid vinylester, isovaleric acid vinylester, 2-ethylhexanoic vinylester, 2,2-dimethyloctanoic acid vinylester, 2-methyl-2-propyl-pentanoic acid vinylester, 4-methyl-4-butylhexanoic acid vinyl ester and vinylesters of neo acids.

12. The composition of claim 11, wherein said chlorofluoro-olefin is chlorotrifluoroethylene, said fluoro-olefin is vinylidene fluoride, and said vinylester is vinylpropionate.

13. The composition of claim 1, wherein said copolymer has a crystallinity index less than about 5%.

14. The composition of claim 1, wherein said copolymer has a weight-average molecular weight between about 2,000,000 and about 20,000,000 daltons.

15. The composition of claim 14, wherein said copolymer has a weight-average molecular weight of about 8,000,000 daltons.

16. The composition of claim 1, further comprising one or more aqueous dispersions of fluoropolymers selected from the group consisting of PTFE, perfluoroalkyl acrylates, polymers of 2-(N-ethylperfluorooctanesulfonamido)ethyl acrylate, polymers of 2-(N-ethylperfluorooctanesulfonamido)ethyl methacrylate, block copolymers of 2-(N-ethylperfluorooctanesulfonamido)ethyl acrylate, block copolymers of 2-(N-ethylperfluorooctanesulfonamido) ethyl methacrylate and polyethylene glycol, FEP, THV and PFA.

17. A composition comprising a chlorofluoro-olefin copolymer having a crystallinity index less than about 10% and a weight-average molecular weight greater than about 600,000 daltons, said copolymer having at least two comonomer units of the formula:

$$CX_2CYA$$

wherein each X is independently selected from the group consisting of H, Cl and F; Y is selected from the group consisting of H, Cl, F, $O(CZ_2)_nCZ_3$, $(CZ_2)_nCZ_3$, $(OCZ_2CZ_2)_n\ CZ_3$ and $(O(CZ_2)_n)_nCZ_3$, wherein each n is independently from about 1 to about 12 and each Z is independently selected from the group consisting of H, Cl and F; and A is selected from the group consisting of H, Cl and F; provided that for at least one comonomer unit, at least one of A, Y, either X or any Z is Cl; and said polymer further comprising a monomer selected from the group consisting of vinylesters and non-halogenated alpha-olefins.

18. The composition of claim 17, wherein said copolymer comprises a chloro-olefin copolymerized with at least one fluoro-olefin and an alkylvinylester.

19. The composition of claim 17, wherein said alkylvinylester is selected from the group consisting of vinylpropionate, vinylacetate, vinylbutyrate, vinylisobutyrate, vinylhexanoate, vinylstearate, neononanoate ethenyl ester, versatic acid vinylester, n-valeric acid vinylester, caproic acid vinylester, lauric acid vinylester, isovaleric acid vinylester, 2-ethylhexanoic vinylester, 2,2-dimethyloctanoic acid vinylester, 2-methyl-2-propyl-pentanoic acid vinylester, 4-methyl-4-butylhexanoic acid vinyl ester and vinylesters of neo acids.

20. The composition of claim 19, wherein chlorofluoro-olefin is chlorotrifluoroethylene, said fluoro-olefin is vinylidene fluoride, and said vinylester is Vinyl propionate.

21. The composition of claim 17, wherein said copolymer has a crystallinity index less than about 5%.

22. The composition of claim 17, wherein the modulus, tensile strength or elongation at break of said films and substrate coatings of said composition do not decrease with said exposure to said UV light.

23. The composition of claim 17, wherein said films and substrate coatings of said composition have a limited oxygen index of at least about 90% as measured by ASTM D2863.

24. The composition of claim 17, wherein said copolymer has a weight-average molecular weight between about 1,000,000 and about 20,000,000 daltons.

25. The composition of claim 24, wherein said copolymers have a weight-average molecular weight of about 8,000,000 daltons.

* * * * *